United States Patent Office 3,259,803
Patented July 5, 1966

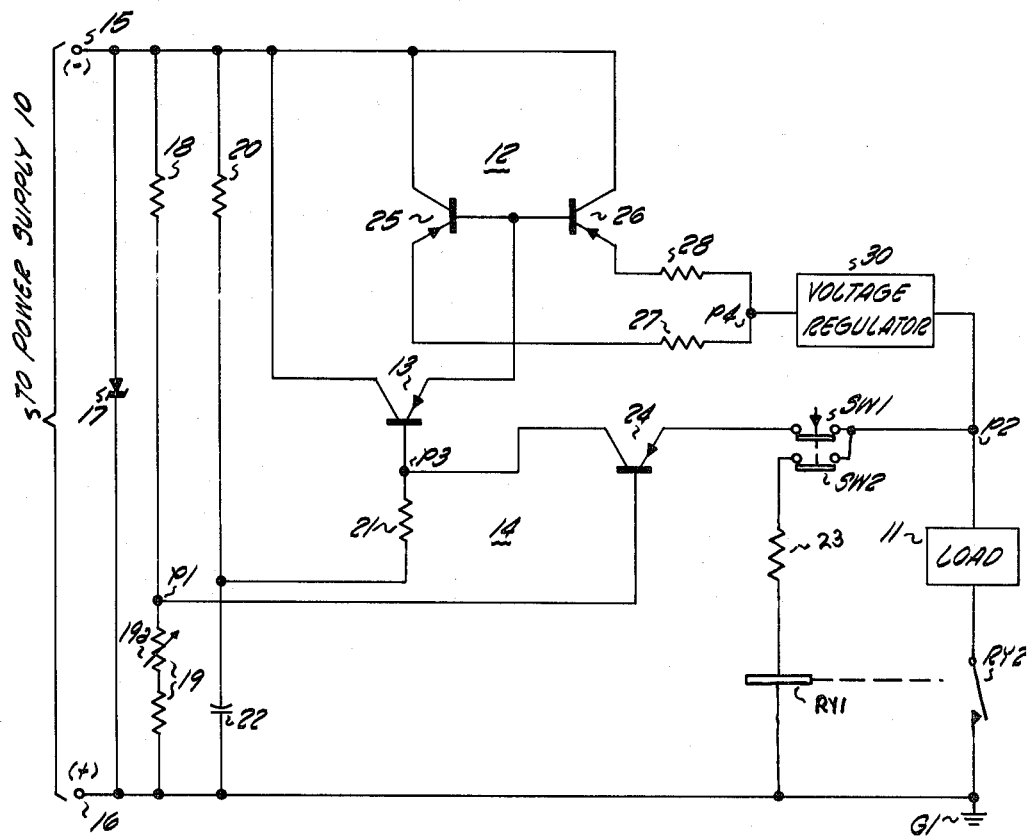

3,259,803
ELECTRONIC CIRCUIT BREAKERS
Joseph Battista, Chicago, Ill., assignor to International Telephone and Telegraph Corporation
Filed Nov. 29, 1962, Ser. No. 240,879
1 Claim. (Cl. 317—31)

This invention relates to circuit breakers and more particularly to electronic circuit breakers.

Circuit breakers are automatic devices which open current carrying circuits during abnormal conditions without damage to the breakers. Heretofore, circuit breakers have generally been electromechanical devices which have worked very well in the older electrical environments. However, the weight and inertia of moving parts in these electromechanical devices prevent the quick response required to protect circuits in the newer electronic environments. For example, a transistor reacts much faster than a conventional circuit breaker can operate or a fuse can burn out. Once a transistor reacts, and after current increases unduly, certain phenomena occur and the transistor drives itself to destruction. Any circuit breaker operation after the phenomena occur is much too late. The transistor is either damaged or destroyed.

Aside from any failure to protect electronic components, the slow response of an electromechanical circuit breaker may also cause a more serious malfunction of associated circuits. For example, suppose that all communications for a given locality depend upon an electronic switching system. Further, suppose that a momentary high voltage could damage one or more components, which damage causes the entire switching system to become unreliable. The direct cost of the component damage is much less than the indirect cost of unreported fires, unsummoned doctors, etc.

Heretofore circuit breakers capable of electronic speed response have had limited current carrying capacity. For example, a zener diode is often connected to ground in an effort to limit electrical voltages to the zener breakdown potential. But, the zener diode and its encapsulation might explode if the conditions change quickly and by a great magnitude. Other known electronic devices suffer from the same limitations.

Accordingly, an object of this invention is to provide new and improved electronic circuit breakers. A more specific object is to provide circuit breakers which respond at electronic speeds. A further object is to provide electronic circuit breakers with relatively high current carrying capacity.

Yet another object of the invention is to provide relatively inexpensive circuit breakers utilizing only standard components.

Still a further object is to provide a general purpose device for use with an electronic power supply which not only delivers a regulated output voltage, but also protects load circuits against overload conditions.

In accordance with one aspect of the invention, an examplary electronic circuit breaker, for interposition between a power supply and a load circuit, comprises at least one electronic switch means for carrying a relatively heavy current. Here the switch includes a pair of parallel connected transistors, each having at least one control electrode coupled to and biased from a trigger means. The trigger means includes a third transistor having one electrode connected to a reference voltage source associated with the power supply and another electrode connected to one side of the load circuit. If conditions are normal, the potential difference across these two electrodes holds the third transistor "on," and it, in turn, holds the current carrying switch "on." Under overload conditions, the potential difference across the third transistor electrodes causes it to turn "off." This removes the driving current from the bias electrode of the electronic switch, which switches "off," thus breaking the circuit.

The above mentioned and other features of this invention and the manner of obtaining them will become more apparent, and the invention itself will be best understood by reference to the following description of an embodiment of the invention taken in conjunction with the accompanying single sheet of drawing which is a schematic circuit diagram showing an exemplary circuit breaker.

The drawing shows an electronic circuit breaker connected between a power supply 10 on the left and a load circuit 11 on the right. The principal sub-assemblies of the circuit breaker comprise an electronic switch 12, a driver device 13 connected to bias the switch 12, and a trigger circuit 14.

The remaining circuit breaker components include a pair of terminals 15, 16 for making (−) and (+) or ground connections, respectively, to the terminals of the power supply 10. A zener diode 17 connected across these terminals protects against surge currents especially when circuit capacitances discharge after the circuit breaker trips. A voltage divider including resistors 18, 19 provides a reference potential P1 which is stable relative to the potential P2 which is applied to one side of the load circuit 11. The resistor 19a is an adjustable device for making fine corrections of the potential difference between points P1, P2. Resistors 20, 21 provide base bias for the transistor 13, and capacitor 22 is part of a capacitance multiplication circuit. Switch SW1, SW2 is a single non-locking, push-to-open key for resetting the circuit breaker after it trips. Relay RY1 and its contacts RY2 provide electromechanical circuit breaking, and resistor 23 drops the voltage of source 10 to the potential required for relay operation.

The trigger circuit 14 includes a semiconductor device 24 (which may be a type RCA 2N1183 transistor, for example). The base of the transistor 24 connects to the reference potential point P1 and the emitter connects to the potential point P2. In one exemplary circuit point P1 is (−) 16 volts and point P2 is (−) 18 volts under normal load conditions. Thus, normally the emitter is about 2 volts negative relative to the base, and the transistor is "off."

If the load 11 should short circuit, the potential at point P2 moves toward the ground potential G1. As the potential at point P2 goes positive (toward ground), the emitter of transistor 24 becomes positive relative to the base. Then, transistor 24 switches "on." When the short circuit disappears from the load 11, the point P2 returns to a potential of about (−) 18 volts and the transistor 24 turns "off."

The driver 13 (also a type RCA 2N1183 transistor, in one case) has its collector connected to supply terminal 15 and its base normally biased to an "on" potential via resistors 20, 21. Thus, electrons flow from the emitter of the transistor 13 into the base regions of the transistors in the electronic switch 12.

To increase current carrying capacity, this exemplary electronic switch 12 includes a pair of parallel connected semiconductor devices 25, 26 (here two type 2N2157 transistors), each having its collector connected to terminal 15 of the power supply. Each transistor has an individual emitter resistor 27, 28 which provides negative feedback to balance the total current flow between the two transistors. If, for example, transistor 26 begins to conduct a greater portion of the total current through switch 12, the IR drop across resistor 27 goes down, and the IR drop across resistor 28 goes up. The transistor 26 is biased to conduct less. The transistor 25 is biased to conduct more. The reverse occurs when an excessive portion of the total current flows through the transistor 25.

The circuit values are such that, during normal operations, the normally "on" transistor 13 switches both of the transistors 25, 26 "on." During overload conditions, point P2 becomes positive relative to point P1; transistor 24 turns "on" to change the potential at point P3; transistors 13, 25, 26 turn "off," thus breaking the current carrying circuit extending from the supply 10 to the load 11.

At point P4 the output from the electronic switch 12 is preferably applied to the input of a voltage regulator 30, of any convenient design. This regulator 30 supplies a constant and unchanging voltage to point P2.

Because of the filtering and regulating effects of the circuit 12, the regulator 30 may be omitted in some installations. First the current balancing effect resulting from the negative feedback of resistors 27, 28 tends to bring a degree of voltage regulated stability at point P4. Second, the capacitor 22, and the transistors 13, 25, 26 cooperate to provide a capacitance multiplier circuit. Thus a very large and effectively regulated capacitance appears between point P4 and ground G1, this capacitance being the capacitance of capacitor 22 multiplied by the total gain of the three transistors 13, 25, 26.

Regardless of whether the voltage regulator 30 is or is not provided, the output voltage is applied across points P2, G1 and, therefore, across the load 11. In parallel with the load is a normally operated relay RY1 and a voltage dropping resistor 23. The relay RY1 controls make contacts RY2 connected in series with the load. Thus, if a correct load condition exists, relay RY1 is operated, contacts RY2 are closed, and the load is energized from source 10. If an overload condition exists, the voltage difference between points P2, G1 goes down, and relay RY1 releases to open contact RY2 and disconnect load 11 from source 10.

An advantage of this operation is that, when an overload condition occurs, the voltage disappears from point P2 at the electronic speed of the transistor 13, 25, 26 response. This gives a short run protection. Later, relay RY1 releases at electromechanical speeds to open the load circuit at contacts RY2 and guard against a long run failure resulting from a continued overload condition. This way the circuit is guarded almost instantaneously, and yet the circuit breaker components are also guarded against long term failures. Moreover, only low cost commercially available components are used, thus giving inexpensive protection.

The operation of the circuit should now be apparent to those skilled in the art. However, it may be well to review such operation, with a few exemplary circuit values supplied, to illustrate a good circuit design. According to this example, point 16 is at ground potential, point 15 is at (—) 25 volts, point P2 is considered operative from (—) 18 to (—) 16 volts and overloaded or shorted from (—) 16 to 0 volts. There will be some capacitance across the terminals 15, 16, either because of the inherent power supply and other stray capacitances or because of a capacitor actually connected across these terminals in a preceding filter circuit. The zener diode 17 breaks down at about (—) 30 to (—) 33 volts with respect to ground to discharge the capacitance across terminals 15, 16. The resistors 18 and 19 are adjusted by the potentiometer 19a to cause the circuit breaker to trip at the desired overload [(—) 16 volts at point P2]. In the cited example, the potentiometer 19a was adjusted so that the total resistance 19, was about twice the resistance 18, and the point P1 was approximately (—) 16 volts. Thus, the base of transistor 24 was two volts more positive than the emitter during optimum load conditions. The resistor 21 was two ohms.

When point P2 becomes positive with respect to point P1, transistor 24 switches "on" to switch "off" transistors 13, 25, 26. Circuit capacitances—either stray or actual—discharge to ground through the zener diode 17. The capacitor 22 also discharges through resistor 21, transistor 24, resistor 23, relay RY1, and load 11 to ground G1. Relay RY1 releases and opens the load circuit at contacts RY2.

To return power to the load, the non-locking manual reset key SW1, SW2 is pushed momentarily. This opens the emitter circuit to transistor 24 which turns "off." When the reset key is released, switch 12 conducts, relay RY1 operates, and power returns to the load. If an overload condition persists, the circuit breaker again trips.

This circuit also protects the power supply 10 and the load 11 from input voltage surges. If for any reason the voltage between points 15 and 16 increases, the voltage drop across resistor 19 also increases. This becomes sufficient to forwardly bias transistor 24 and turn "off" the power supply.

While the principles of the invention has been described above in connection with specific apparatus and applications, it is to be understood that this description is made only by way of example and not as a limitation on the scope of the invention.

I claim:

An electronic circuit breaker comprising electronic switch means coupled between a power supply and a load circuit for conducting a relatively heavy current from said supply to said load, said switch means including a pair of parallel connected semiconductor devices, each of said semiconductor devices having one electrode coupled to said power supply and another electrode coupled to said load, means for balancing the total current flow between the two devices, said balancing means including a resistor connected in series with each of said devices to provide negative feedback, trigger means for controlling the application of signals to said switch means and for selectively switching said switch means "off" and "on," means for providing a source of reference potential relative to the potential applied across said load including a Zener diode and a voltage divider incorporating a variable resistor connected in parallel across the output of said power supply, said Zener diode being coupled to conduct capacitively caused surge currents to ground, said trigger means including a transistor having its base electrode connected to said source of reference potential and having its emitter electrode connected to the potential applied across said load, means including said trigger means for selectively switching said switch means "off" or "on" as a function of the voltage difference between said applied potential and said reference potential, capacitance multiplier means including said switch means for filtering and regulating the output of said power supply, and electromechanical circuit breaking means associated with said load for breaking the circuit from said supply to said load to provide long term protection against overload conditions.

References Cited by the Examiner

UNITED STATES PATENTS

| | | | |
|---|---|---|---|
| 2,789,254 | 4/1957 | Bodle | 317—33 X |
| 2,976,462 | 3/1961 | Miller | 317—31 X |
| 2,980,845 | 4/1961 | Thompson et al. | 317—33 X |
| 3,049,632 | 8/1962 | Staples | 317—33 X |
| 3,079,543 | 2/1963 | Decker | 317—33 X |
| 3,117,253 | 1/1964 | Antoszewski. | |

MILTON O. HIRSHFIELD, *Primary Examiner.*

SAMUEL BERNSTEIN, *Examiner.*

J. D. TRAMMELL, *Assistant Examiner.*